Jan. 16, 1934. T. H. WILLIAMS ET AL 1,943,996
APPARATUS FOR MAKING INFLATABLE ARTICLES
Filed May 4, 1931   5 Sheets-Sheet 1

INVENTORS
THOMAS H. WILLIAMS
AND
CHARLES S. MOOMY
BY Ely Barrow
ATTORNEYS

INVENTORS
THOMAS H. WILLIAMS
AND
CHARLES S. MOOMY.
By Ely Barrow
ATTORNEYS

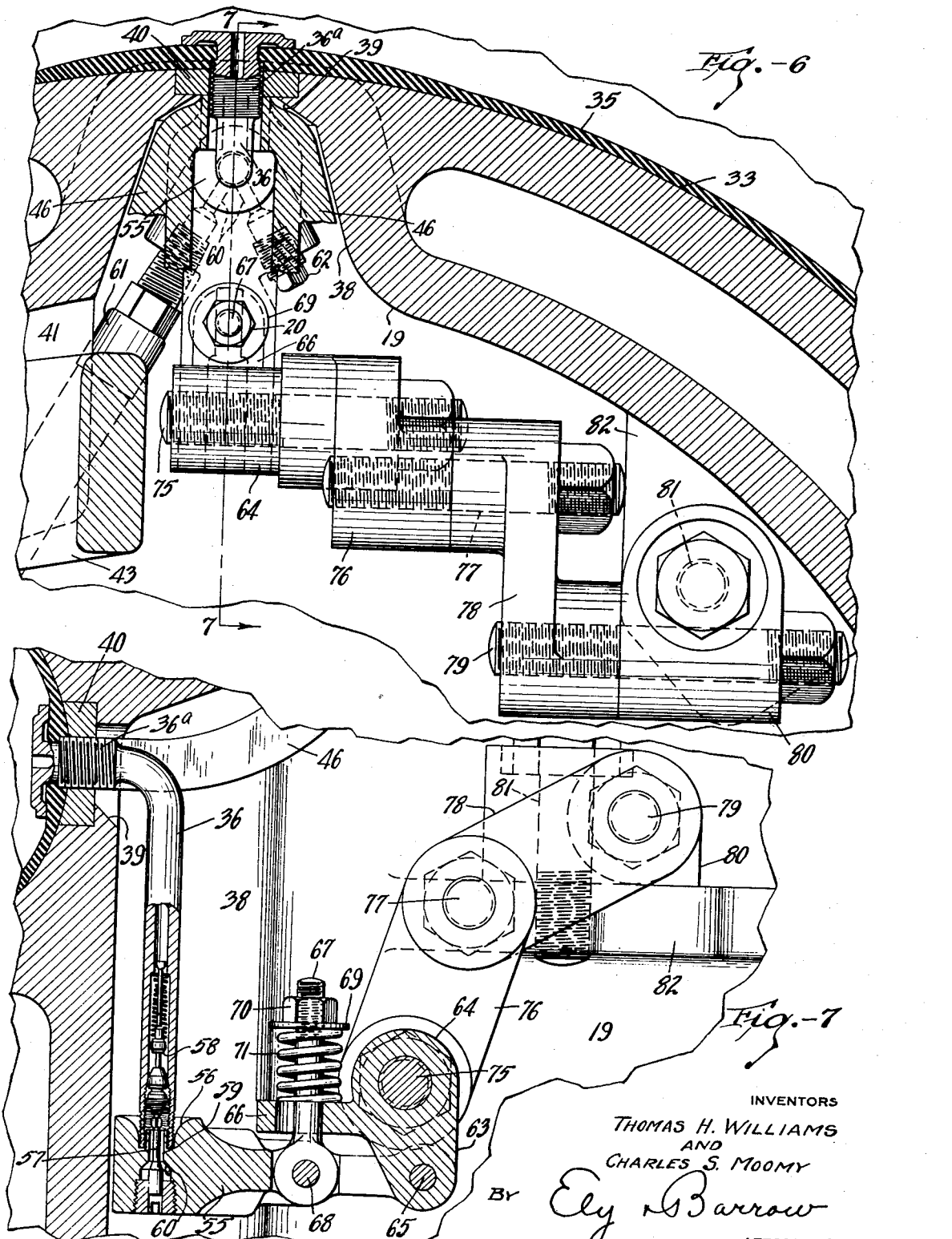

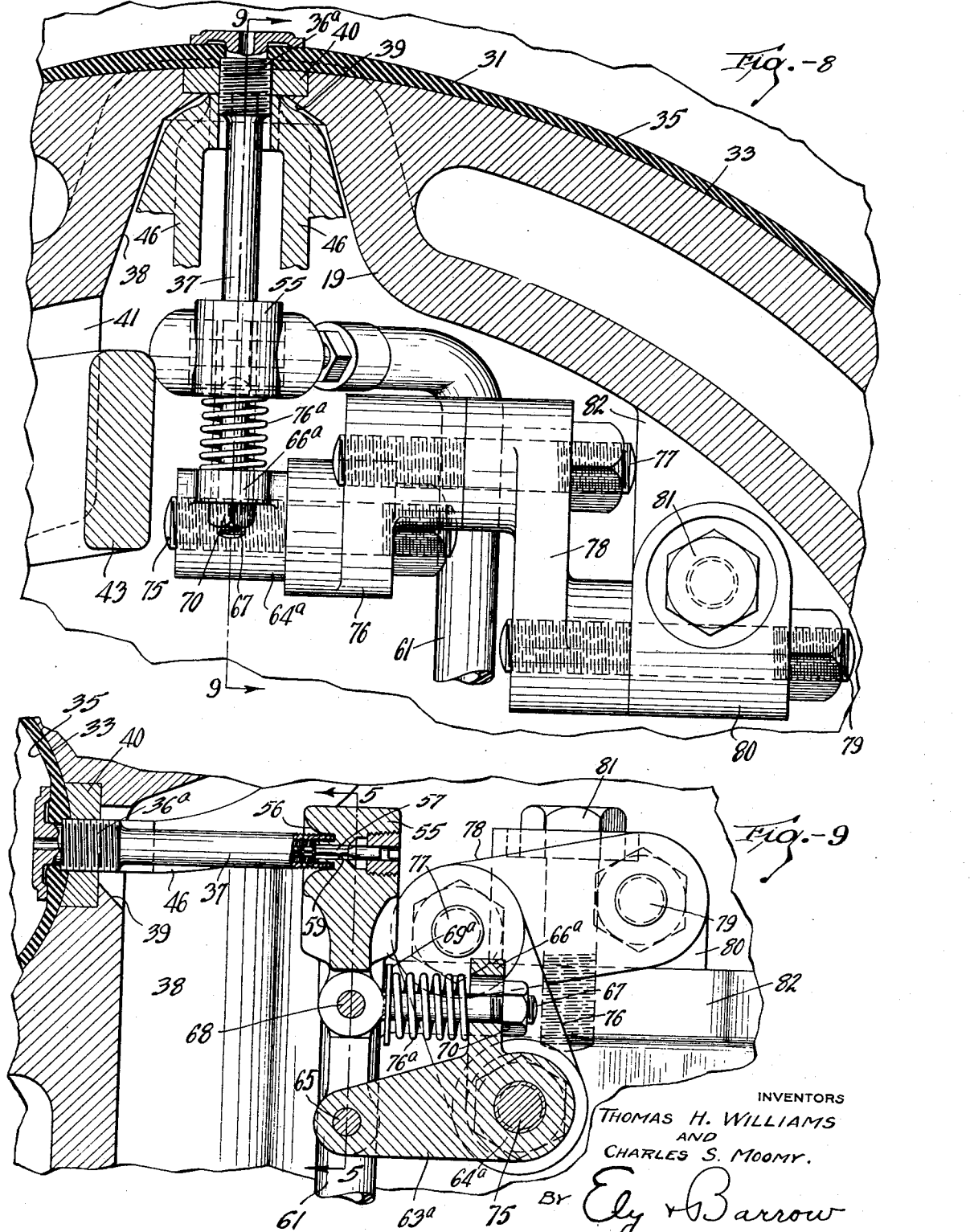

Patented Jan. 16, 1934

1,943,996

UNITED STATES PATENT OFFICE 1,943,996

APPARATUS FOR MAKING INFLATABLE ARTICLES

Thomas H. Williams, Akron, Ohio, and Charles S. Moomy, Carlisle, Pa., assignors to National Rubber Machinery Company, Akron, Ohio, a corporation of Ohio Application May 4, 1931. Serial No. 534,836

10 Claims. (Cl. 18—19)

This invention relates to improved apparatus for making inflatable articles, and more especially it relates to apparatus for molding and vulcanizing hollow, inflatable rubber articles, such as inner tubes for pneumatic tire casings.

The manufacture of molded inner tubes requires that heated fluid be injected into the tube to distend the same against the mold wall during vulcanization, and requires that the valve stem of the tube, through which the heated fluid is delivered into the tube, be securely held in position so as not to be forced against the tube wall by the pressure of the fluid within the tube. It is to the improvement of means for supporting the valve stem, and for delivering heated fluid thereto, that this invention chiefly is directed.

The chief objects of the invention are to provide, in an inner tube vulcanizer, simple and quickly operated mechanism for engaging and supporting a valve stem; and to provide mechanism having a wide range of adjustability for connecting a fluid pressure line to the valve stem. Other objects will be manifest as the specification proceeds.

Of the accompanying drawings,

Figure 1 is a vertical section through an inner tube vulcanizer of the unit or watchcase type embodying the invention in its preferred form, and the work therein;

Figure 2 is a detail sectional view, on a larger scale, of part of the apparatus shown in Figure 1, comprising the improved features thereof;

Figure 2:
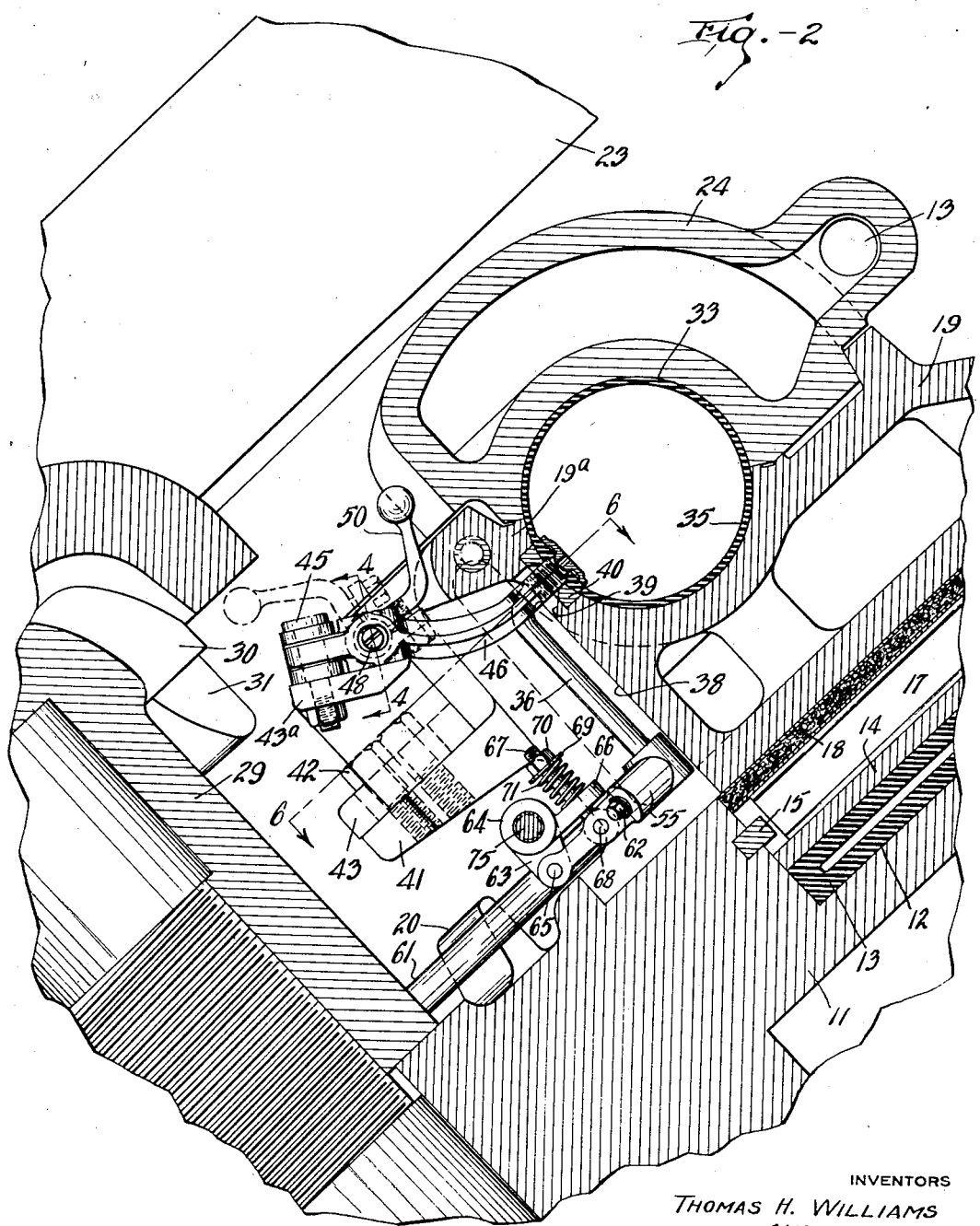
Figure 5:
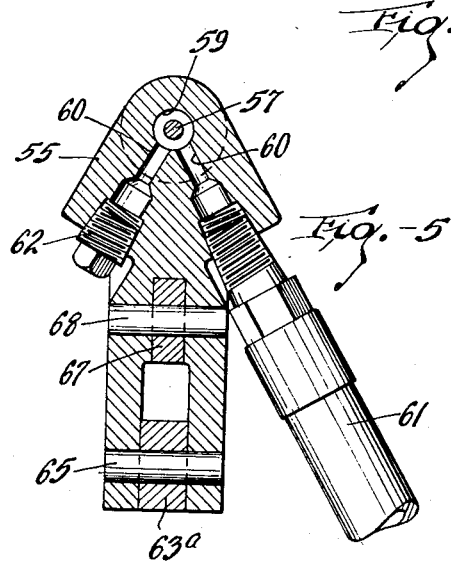
Figure 4:
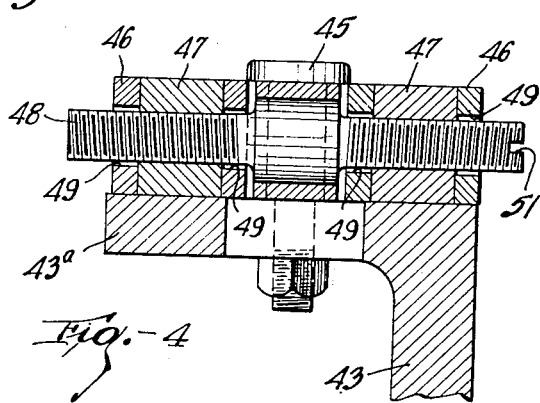
Figure 4 is a section on the line 4—4 of Figure 2.

Figure 5 is a section on the line 5—5 of Figure 9;

Figure 6 is a section on the line 6—6 of Figure 2;

Figure 7 is a section on the line 7—7 of Figure 6;

Figure 8 is a section similar to Figure 6 showing an alternative arrangement of mechanism for connecting fluid conductor pipes to straight valve stems; and Figure 9 is a section on the line 9—9 of Figure 8.

Figure 1:
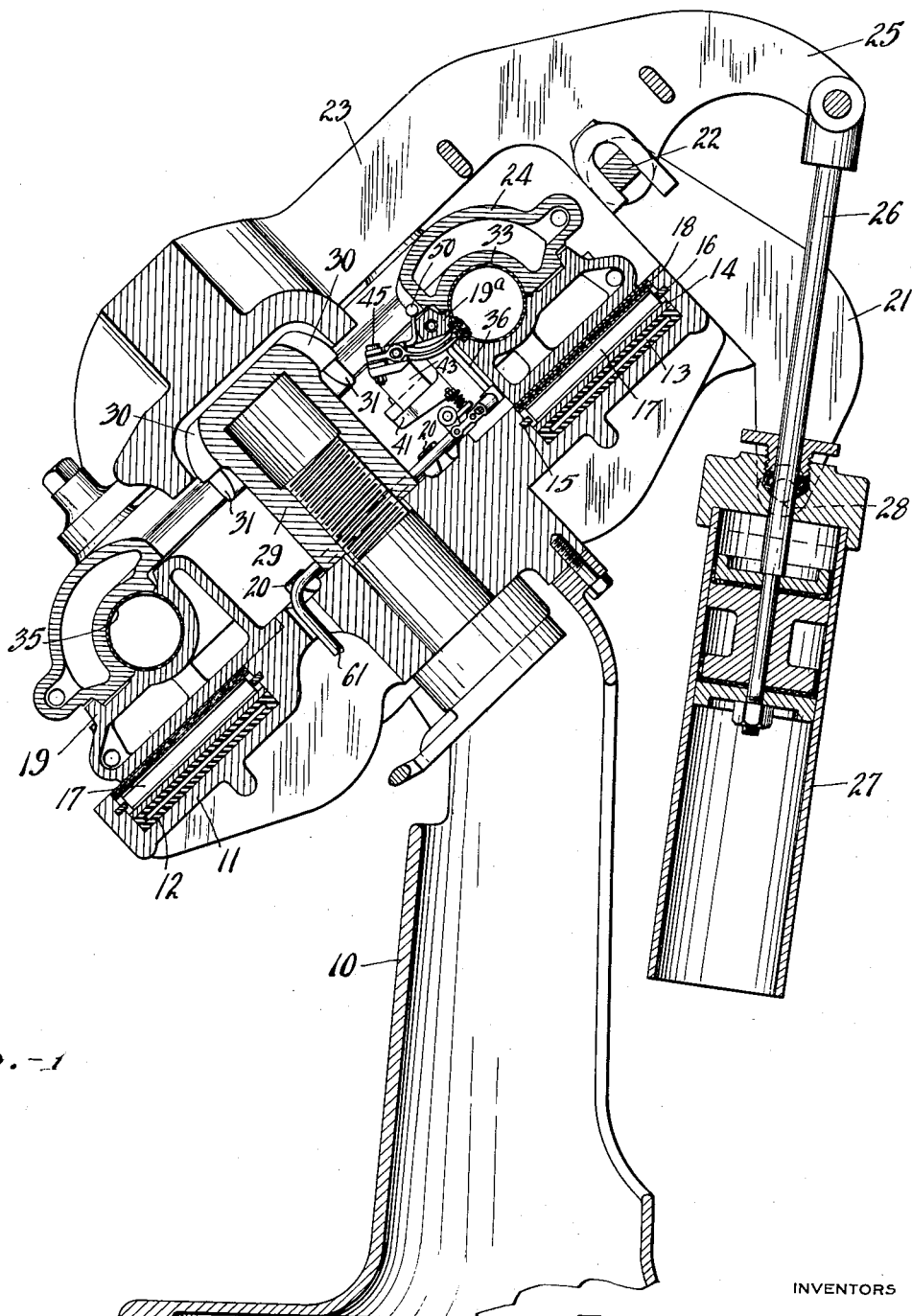

Referring to Figure 1 of the drawings, 10 is a pedestal support and 11 is a table or platen fixedly mounted upon the top thereof, said platen preferably being inclined as shown with its lowest point at the front. The top of the platen is formed with a concentric annular recess 12, in the bottom of which is mounted an annular distensible tube 13, and resting upon said tube is an annular metal plate 14 adapted to be lifted upon inflation of the tube 13. Split rings 15, 16 inset respectively into the inner and outer peripheral walls of the recess 12 determinately limit the elevation to which the plate 14 can be lifted. A plurality of radially disposed channels or spacer members 17 are mounted upon the upper face of the plate 14, and resting upon said channels is an annular heat-insulating member 18 comprising a heavy central structure of asbestos or similar material of low thermal conductivity having its respective faces covered with sheet metal to resist wear. The upper face of the composite ring 18 normally is flush with the top of the platen 11.

Seated upon the platen 11 is the bottom half 19 of an annular, two-part mold, said mold section being centrally positioned thereon by a plurality of upstanding lugs 20, 20 on the platen top that engage the inner peripheral wall of the mold section, yet permit axial movement of the latter under the impetus of the expansible tube 13.

Secured to the platen 11 at the rear or high side thereof is a pair of bracket arms, such as the arm 21, Figure 1, and journaled in the upper ends of said arms is a pivot pin 22 that has a square central portion between said arms. Mounted up the square portion of the pivot pin 22, so as to be movable relatively thereof, is an upper platen or spider 23, to the under side of which is secured the upper mold section 24 of the annular two-part mold. The spider 23 has a pair of rearwardly extending arms, such as the arm 25, Figure 1, which are connected to the outer end of the piston rod 26 of a fluid pressure cylinder 27, the latter being pivotally mounted at 28 between the lower ends of the bracket arms 21. The fluid pressure cylinder 27 is adapted to raise and lower the spider 23 to open and close the mold. The spider is adapted to be locked in its lowered, mold-closing position, by means of an axial, rotatable, locking post 29 that projects upwardly through the mold sections at the axis thereof and has its upper end portion formed with a plurality of spaced-apart lugs 30, 30 adapted to interlock with a complemental series of lugs 31, 31 extending downwardly from the spider 23.

The mold sections 19, 24 preferably are steam jacketed as shown, for vulcanizing an article confined in an annular molding cavity 33 within the mold. The parting plane of the mold is above the central plane of the molding cavity 33 at the inner periphery thereof, and below said central plane at the outer periphery of said cavity, the arrangement providing a low, inner peripheral wall 19ª above the central plane of the cavity in the lower mold section 19 which wall provides the desirable "button" effect that facilitates the mounting of an unvulcanized tube in said lower molding cavity. The molding cavity 33, however, is divided diametrically by the said parting plane.

The work to be molded and vulcanized in the apparatus consists of an annular rubber tube 35, and a valve stem is mounted in a suitable aperture formed in the inner peripheral wall thereof, said valve stem being shown as an angle stem 36 in Figures 1-7 of the drawings and as a straight stem 37 in Figures 8-9 of the drawings.

Formed in the inner peripheral wall of the lower mold section 19, at the rear thereof, is a re-entrant or recess 38 that extends from adjacent the top of the wall 19ª to the bottom of the mold section. At the central plane of the molding cavity 33, a tapered aperture 39 extends through the wall of the mold section 19 and opens into the recess 38, and an apertured disc 40 is removably mounted in axial alignment with the aperture 39 in the wall of the cavity 33, the exposed face of the disc 40 being flush with the surface of the said cavity. The arrangement is such that a valve stem 36 may be passed through the aperture of the disc 40 and suitably positioned within the recess 38, the threaded portion 36ª at the base of the valve stem fitting nicely within the aperture in said disc. The disc 40 is removable to permit replacing with other discs having different size apertures to accommodate respective valve stems having different size threaded portions at their bases.

In order that the valve stem 36 will be fixedly positioned during the vulcanizing operation, manually operated means is provided for gripping and holding said stem. To this end an inwardly projecting lug 41 is formed on the inner periphery of the lower mold section 19, laterally of the recess 38 therein, and adjustably mounted upon said lug, by bolts 42, 42, is an angular bracket 43 that has an inclined offset portion 43ª positioned in front of the recess 38, somewhat above the central plane of the mold. Pivotally mounted at 45 upon the offset portion 43ª of the bracket 43 is a pair of arcuate jaws 46, 46 that extend into the recess 38 and have their free ends positioned within the tapered aperture 39, being adapted to engage the opposite sides of the threaded portion 36ª of a valve stem 36 therein. Preferably the free ends of the jaws are arcuately formed so as to embrace said valve stem. The adjustability of the bracket 43 permits adjustment of the jaws 46 radially of the mold.

Figure 3:
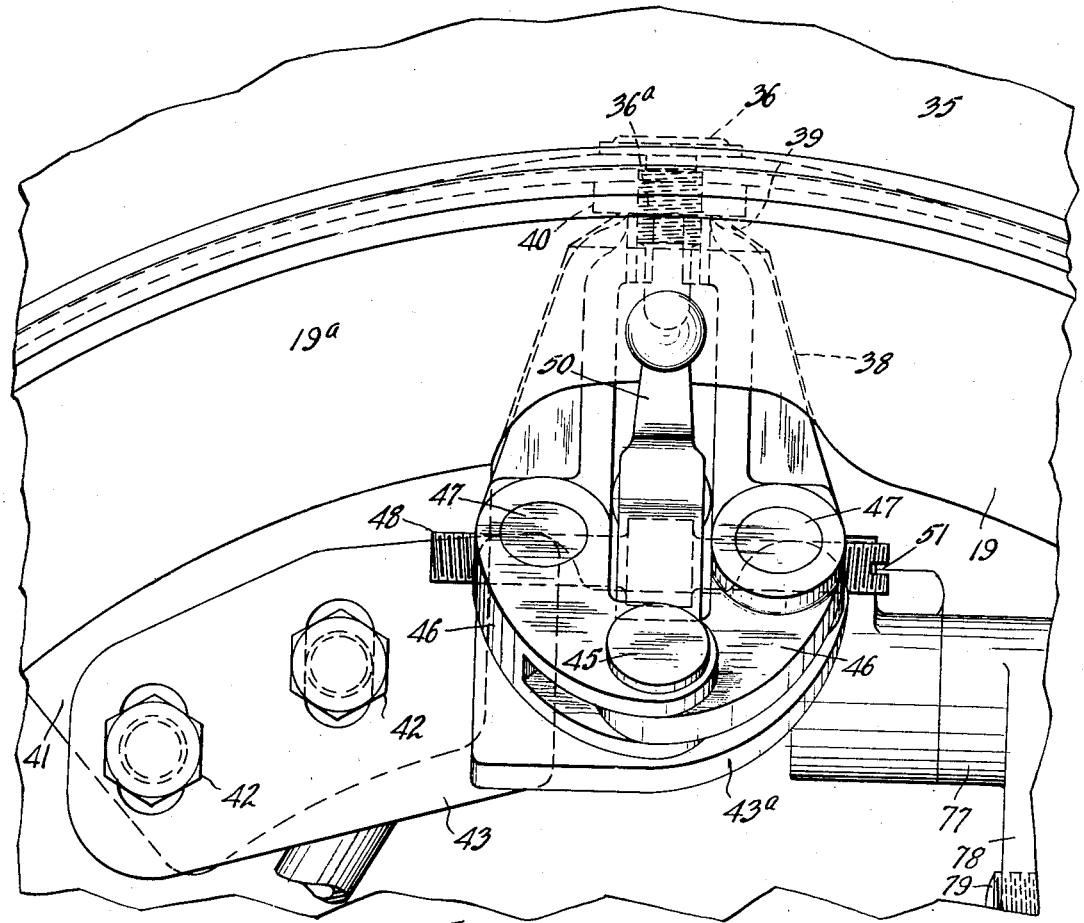
Figure 3 is a fragmentary plan of the vulcanizer viewed parallel to the axis thereof, and the work therein, in the region of the improved mechanism, the cover of the vulcanizer being removed.

The intermediate portions of the jaws 46 are somewhat spaced apart from each other as is most clearly shown in Figure 3, and swiveled in said intermediate portions, on parallel axes, are respective cylindrical nuts 47, 47 that are engaged by the respective threaded portions of a right and left hand screw 48, the lateral walls of the jaws being suitably apertured at 49, 49 (Figure 4) to permit the passage of the screw therethrough. An operating lever 50 is clamped to the central portion of the screw 48, between the jaws 46. The arrangement is such that simple movement of the operating lever 50 opens or closes the free ends of the jaws 46. One end of the screw 48 is slotted at 51 to permit the screw to be rotated by means of a screw driver, independently of the lever 50, upon occasion, such as the initial adjusting of the jaws.

For connecting the valve stem 36 with a source of vulcanizing fluid such as steam, a nozzle member 55 is yieldingly mounted within the recess 38 in position to engage the end of the valve stem therein, said nozzle member being formed on its upper side at one end with a socket 56 in which the end of the valve stem seats, and having a pin 57 so mounted in said socket as to lift the valve 58 in the valve stem off its seat so as to open the valve whenever the stem is engaged by the nozzle. The pin 57 is mounted centrally of an axial passage 59 in the nozzle, which passage communicates with a pair of passages 60, 60 which diverge therefrom and terminate on opposite sides of the nozzle member. One of the passages 60 has connection with a flexible fluid conducting pipe 61 through which heated fluid is conducted to or from the valve stem 36, the other passage being closed with a threaded plug 62. The arrangement permits the flexible pipe 61 to be connected to the side of the nozzle 55 that is most accessible.

The other end portion of the nozzle member 55 is bifurcated or forked, and straddles a downwardly projecting lug 63 formed on a nozzle holder 64, the nozzle being pivotally connected to the lug 63 at 65. The nozzle holder 64 also is formed with an apertured ear 66 that projects over the nozzle member, and a stud 67 that is pivoted at 68 in the forked portion of the nozzle 55 extends upwardly through the aperture in the ear 66 and has its free end provided with a washer 69 and nut 70, there being a compression spring 71 mounted upon the stud between the ear 66 and the washer 69. The arrangement is such that with the holder 64 determinately positioned, the spring 71 yieldingly urges the free end of the nozzle 55 upwardly against the end of the valve stem 36.

The holder 64 is mounted at 75 for angular adjustment upon one end of a link 76, the other end of which is similarly connected at 77 to one end of a second link 78, the other end of the latter being similarly connected at 79 to a bracket 80 that is adjustably swiveled at 80 upon a projecting lug 82 formed on the inner peripheral wall of the lower mold member 19. The pivotal connections 75, 77 and 79 are parallel to each other and to the plane of the mold, and the swivel connection 81 is perpendicular to the connections 75, 77 and 79 and the plane of the mold. The arrangement provides an articulated support capable of vertical and horizontal adjustment for the nozzle 55 whereby the latter may be accurately positioned to engage angular valve stems of various lengths. An alternative nozzle holder is substituted when the nozzle has to engage straight valve stems, such as the valve stem 37.

In the operation of the apparatus, when the mold is open the upper mold section 24 is in raised position (not shown), and the operating lever 50 of the valve stem clamp is in the alternative position shown in broken lines in Figure 2. This permits an unvulcanized inner tube 35 to be mounted in the molding cavity of the lower mold section 19 by "buttoning" it over the wall 19ª on the inner periphery of said mold cavity, the valve stem 36 of the inner tube being passed through the aperture in the disc 40 and positioned within the recess 38 in the lower mold section as shown, with its free end seated in the socket 56 of the nozzle 55, which nozzle is yieldingly urged against the valve stem by the spring 71. The clamping lever 50 is then thrown to the position shown in full lines in Figures 1, 2 and 3 to cause the jaws 46 firmly to engage the threaded portion 36ᵃ of the valve stem to hold the latter in fixed position, and the fluid pressure cylinder 27 is exhausted to lower the upper mold section 24 into place upon the lower mold section.

After the mold sections are locked together by angular movement of the locking post 29, heated vulcanizing fluid is admitted to the tube 35 through the valve stem 36, and vulcanization of the tube is effected in the usual or preferred manner. After the work is vulcanized the vulcanizing fluid in the interior thereof is vented or removed through the valve stem 36, the valve 58 of which is held open by the pin 57 of the nozzle 55. The operations of mounting the work are reversed to remove it from the apparatus.

In mounting the work in the apparatus, the head of the valve stem 36, which head is disposed interiorly of the tube 35 is drawn lightly into contact with the inner wall of the tube as shown. This arrangement is not essential, however, and the apparatus may be so constructed as to support the valve stem in a position that holds its head in spaced relation to the inner wall of the tube.

Attention is now directed to Figures 8 and 9 of the drawings showing the arrangement of the nozzle 55 and its supporting structure when the work is provided with a straight valve stem 37, said supporting structure and nozzle being identical with the previously described parts except for a slightly different nozzle holder 64ᵃ. The nozzle holder 64ᵃ is formed with a laterally projecting lug 63ᵃ that is pivotally connected to the nozzle 55 at 65, and also is formed with an upwardly extending apertured ear 66ᵃ, through the aperture of which extends the stud 67 that is pivotally connected to the nozzle 55 at 68. A compression spring 76ᵃ is mounted upon the stud 67 between the ear 66ᵃ and a washer 69ᵃ that is mounted upon the stud adjacent the nozzle 55. A nut 70 is mounted upon the stud 67 on the opposite side of the ear 66ᵃ from the spring 76ᵃ. The arrangement is such that the spring 76ᵃ normally urges the nozzle 55 in the direction of the valve stem 37 so as yieldingly to engage the end thereof.

The arcuate contour of the gripper jaws 46 permits them to grip the radially disposed portion of an angle or straight valve stem, yet permits the supporting structure for the jaws to be so positioned as not to obstruct the nozzle mechanism when the latter is arranged to engage straight valve stems.

The apparatus may be variously modified within the scope of the appended claims, which are not limited wholly to the specific construction shown and described.

What is claimed is:—

1. In apparatus of the character described, the combination of a mold having a cavity to receive the article and an aperture through its wall to accommodate a valve stem of the article, a pair of gripper jaws adapted to engage said valve stem exteriorly of the mold, a support upon which the gripper jaws are pivotally mounted, and a right and left hand screw operating the gripper jaws in unison.

2. A combination as defined in claim 1 in which the support for the gripper jaws is adjustable to permit the gripper jaws to be adjusted radially with relation to the mold.

3. A combination as defined in claim 1 in which the support for the gripper jaws is inclined with relation to the plane of the work, and the gripper jaws are arcuately formed so that their work-engaging end portions are parallel to the plane of the work.

4. In apparatus of the character described, the combination of a mold formed with a cavity for receiving the work and having an aperture through its wall to accommodate a valve stem of the work, said mold having its wall recessed about said aperture, a pair of pivotally mounted, arcuate gripper jaws having their free ends positioned in said recess and adapted to grip said valve stem exteriorly of the mold, an adjustable support upon which said gripper jaws are pivotally mounted, said support being inclined with relation to the plane of the work, and a right and left hand screw for operating the gripper jaws.

5. In apparatus of the character described, the combination of a mold having a cavity for an article and an aperture to receive a valve stem thereof, means for rigidly holding the valve stem in determinate position, a nozzle adapted to engage the outer end of the valve stem, and an articulated support for said nozzle.

6. Apparatus as defined in claim 5 including yielding means for urging the nozzle into engagement with the valve stem.

7. In apparatus of the character described, the combination of a mold for an article, said mold being formed with an aperture to admit a valve stem of the article to the exterior of the mold, a nozzle adapted to direct fluid into said valve stem, and a rigid support for said nozzle having universal adjustability for determinately positioning of said nozzle.

8. In apparatus of the character described, the combination of a mold for an article, said mold being formed with an aperture to admit a valve stem of the article to the exterior of the mold, a nozzle for conducting fluid to said valve stem, and an articulated support for said nozzle adjustably swivelled upon the mold.

9. A combination as defined in claim 8 including yielding means for urging the nozzle into engagement with the valve stem.

10. In apparatus of the character described, the combination of a mold for an article, said mold being formed with an aperture to admit a valve stem of the article to the exterior of the mold, a nozzle adapted to direct fluid into said valve stem, a rigid support for said nozzle having universal adjustability for normally fixedly positioning said nozzle with relation to the mold, said nozzle being pivoted on said support, and yielding means normally urging said nozzle to determinate position with relation to said support.

THOMAS H. WILLIAMS.
CHAS. S. MOOMY.